United States Patent [19]

Wiers

[11] Patent Number: 5,469,930
[45] Date of Patent: Nov. 28, 1995

[54] MOTORCYCLE REAR WHEEL SUSPENSION

[75] Inventor: Paul C. Wiers, Milwaukee, Wis.

[73] Assignee: Harley-Davidson, Inc., Milwaukee, Wis.

[21] Appl. No.: 261,683

[22] Filed: Jun. 17, 1994

[51] Int. Cl.[6] ............................ B62K 25/04; B62D 61/02
[52] U.S. Cl. ............................................ 180/227; 180/219
[58] Field of Search ...................................... 180/219, 227

[56] References Cited

U.S. PATENT DOCUMENTS

| | | | |
|---|---|---|---|
| 1,148,707 | 8/1915 | Morley | 180/227 |
| 4,457,393 | 7/1984 | Tamaki et al. | 180/227 |
| 5,062,495 | 11/1991 | Padgett | 180/227 |

FOREIGN PATENT DOCUMENTS

| | | | |
|---|---|---|---|
| 1567774 | 5/1980 | United Kingdom | 180/227 |
| 2084525 | 4/1982 | United Kingdom . | |

OTHER PUBLICATIONS

Harley–Davidson Parts Catalog Sportster 1961 to 1971, p. 56.
Harley–Davidson Parts Catalog SS/SX–175/250 1974 to 1978, p. 58.
Harley–Davidson Parts Catalog Sportster XLH/XLCH–1000 1979, p. 52.
Harley–Davidson Parts Catalog FLT Models 1980 to 1983, p. 70.
Harley–Davidson Parts Catalog XLH Models 1986, p. 54.
Harley–Davidson Parts Catalog FXR Models 1984, p. 60.
Harley–Davidson Parts Catalog 1984 FXST; 1985 FX Models, pp. 68 and 70.
Harley–Davidson Parts Catalog FL Models 1941–1984, p. 134.

*Primary Examiner*—Mitchell J. Hill
*Attorney, Agent, or Firm*—Michael, Best & Friedrich

[57] ABSTRACT

A motorcycle frame, an engine and transmission mounted on the frame, a drive sprocket coupled to the transmission and rotatively mounted about a first axis, a rear wheel suspension including a roller arm having a plurality of rollers at one end and rotatably supporting a rear wheel at the other end. An arcuate support is provided on the frame for supporting the roller arm for movement in an arcuate path whose center of curvature is coincident with the axis of the drive sprocket. A spring/damper is connected between the frame and the roller arm. A driven sprocket is mounted on the rear wheel and a drive belt or chain extends around the drive and driven sprockets.

17 Claims, 3 Drawing Sheets

MOTORCYCLE REAR WHEEL SUSPENSION

BACKGROUND OF THE INVENTION

This invention relates to motorcycles, and more particularly, to motorcycle suspensions.

Prior art motorcycles generally include a frame for supporting an engine and transmission and a rear wheel suspension which absorbs road shocks to provide the operator with a more comfortable ride. Such prior art motorcycle rear wheel suspensions generally include a rear fork or swing arm pivotally mounted at one end on the frame and which rotatably supports the rear wheel at the other. In addition, a spring/damper may be provided between the motorcycle frame and the swing arm. Such motorcycles are commonly driven by a belt or chain extending from a drive sprocket coupled to the transmission to a driven sprocket mounted on the rear wheel. Motorcycle drive belts normally comprise a flexible member having molded teeth while drive chains comprise a continuous belt of pivotally connected metallic links. For purposes of brevity, the term belt or belt means as used hereinafter is defined as either a belt or a link chain as used in motorcycle drive assemblies.

Drive belt life is directly related to the ability to maintain accurate matching of belt and sprocket teeth. This can be ensured only when the center distance between drive and driven sprockets is prescribed and maintained. Prior art designs have effected this by concentrically pivoting the swingarm about the transmission output shaft and drive sprocket rotational axis. Design complexity, design packaging, and serviceability access issued have prevented wide spread use of this design in production motorcycles. The most often employed method of swingarm pivoting and mounting is in a manner non-concentric with the drive sprocket.

As the non-concentrically mounted swingarms of prior art motorcycles pivot under the influence of road shocks, the distance between the centers of drive and driven sprockets varies thereby disallowing consistent matching or meshing of belt and sprocket teeth. This adversely affects belt life. Moreover, changes in tension of the belt or chain adversely affects the smoothness of the ride.

Uniform feel and handling characteristics during vehicle acceleration of prior art motorcycles, with non-concentric swingarm mounting, is adversely affected by excessive variation in the degree of suspension "anti-squat". Anti-squat is defined as the force imparted to the vehicle, through drive belt tension and rear suspension geometry, which resists rear suspension vertical travel or "jounce" due to weight transfer under vehicle acceleration. Vehicle acceleration is directly affected by the traction or tractive effort available. Tractive effort is directly proportional to the vertical force between the road surface and the drive tire patch. Reduction in the degree of anti-squat during suspension displacement adversely affects the increase in the tire patch force and consequential traction as weight is transferred to the rear wheel under acceleration. Reduction in available traction as the vehicle suspension undergoes acceleration induced jounce, reduces uniformity of vehicle feel and handling characteristics.

SUMMARY OF THE INVENTION

It is an object of the invention to provide a new and improved motorcycle suspension.

Another object of the invention is to provide a motorcycle rear wheel suspension that maximizes consistency of belt tooth to sprocket meshing through maintenance of center distance between drive and driven sprockets, throughout suspension travel.

A further object of the invention is to provide a motorcycle rear wheel suspension which prolongs drive belt life.

It is yet another object of the invention to provide a motorcycle rear wheel suspension which minimizes changes in the degree of anti-squat over the range of suspension travel.

These and other objects and advantages of the invention will become apparent from the detailed description thereof taken with the accompanying drawings.

In general terms, the invention comprises the combination of a motorcycle frame and rear wheel support means for rotatively supporting a wheel, means for supporting the wheel support means on the frame for movement in an arcuate path whose center of curvature is coincident with the drive sprocket to maintain constant the distance between the drive sprocket and the driven sprocket mounted on the rear wheel as the rear wheel support means is displaced during operation of the motorcycle.

DETAILED DESCRIPTION OF THE PREFERRED EMBODIMENT

Figure 1:
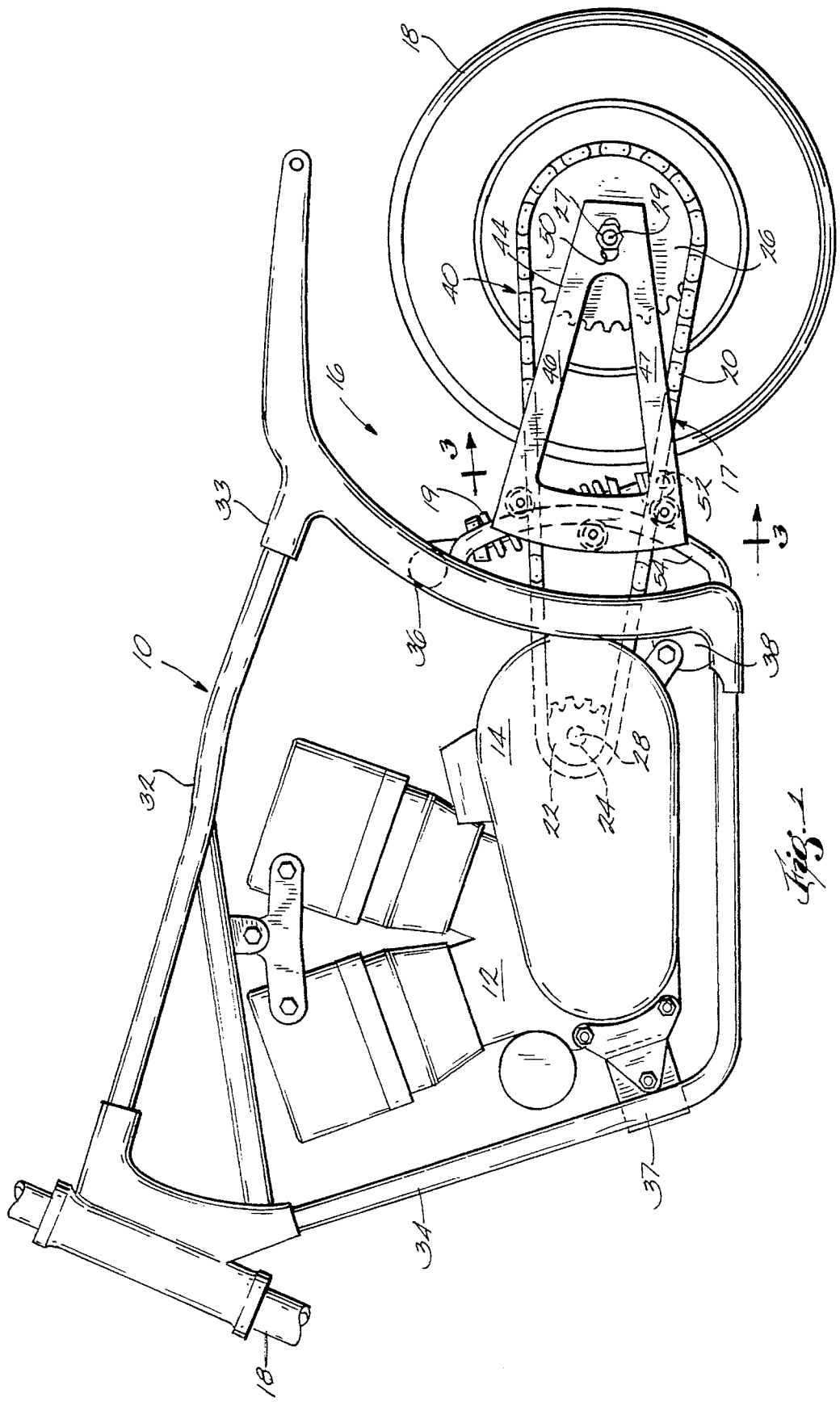
FIG. 1 shows a motorcycle frame and rear wheel suspension according to the preferred embodiment of the invention.

FIG. 1 shows a motorcycle frame 10 which supports an engine 12 and a transmission 14 suitably mounted on the frame 10 in a manner well known in the art. A rear wheel suspension 16 includes wheel support means which in the preferred embodiment comprises a roller arm 17 mounted at the rear of the frame 10 for rotatably supporting a rear wheel 18. At least one spring/damper 19 extending between the frame 10 and the roller arm 17. A front fork 18 is pivotally mounted at the front of the frame 10. A front wheel (not shown) and handle bars (not shown) are mounted at the lower and upper ends of the front fork 18, respectively. In addition, the motorcycle includes a gas tank, instrumentation, a seat, an exhaust system and other conventional components, none of which are shown but are well-known in the art.

Those skilled in the art will appreciate that the motorcycle is driven by a belt means 20 which may be a belt or chain extending between a drive sprocket 22 mounted on the transmission output shaft 24 and a driven sprocket 26 mounted on the rear wheel axle 27. The sprockets 22 and 26 rotate respectively about axes 28 and 29.

Frame 10 is of a generally tubular construction and includes a top tube 32, a seat support 33, spaced apart down tubes 34 which extend downwardly and rearwardly from the front end of the top tube 32, and a pair of spaced rear tubes 36 extending downwardly from the rear of the seat support to the rear of the down tubes 34. While only a single one of the tubes 34 and 36 can be seen in FIG. 1, it will be appreciated that second tubes are disposed in a spaced apart relation behind the first as viewed from the side. The tubes 34 and 36 are maintained in a spaced apart relation by cross members, such as 37 and 38, which also serves as one of the supports for the engine 12 and the transmission 14.

Figure 2:
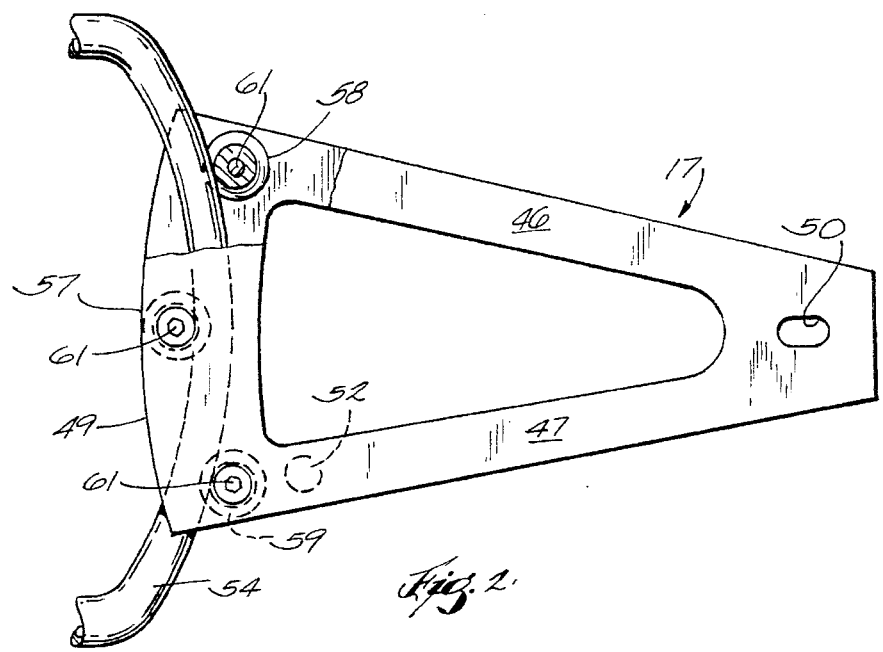
FIG. 2 is a side elevational view of the rear wheel suspension shown in FIG. 1.
Figure 4:
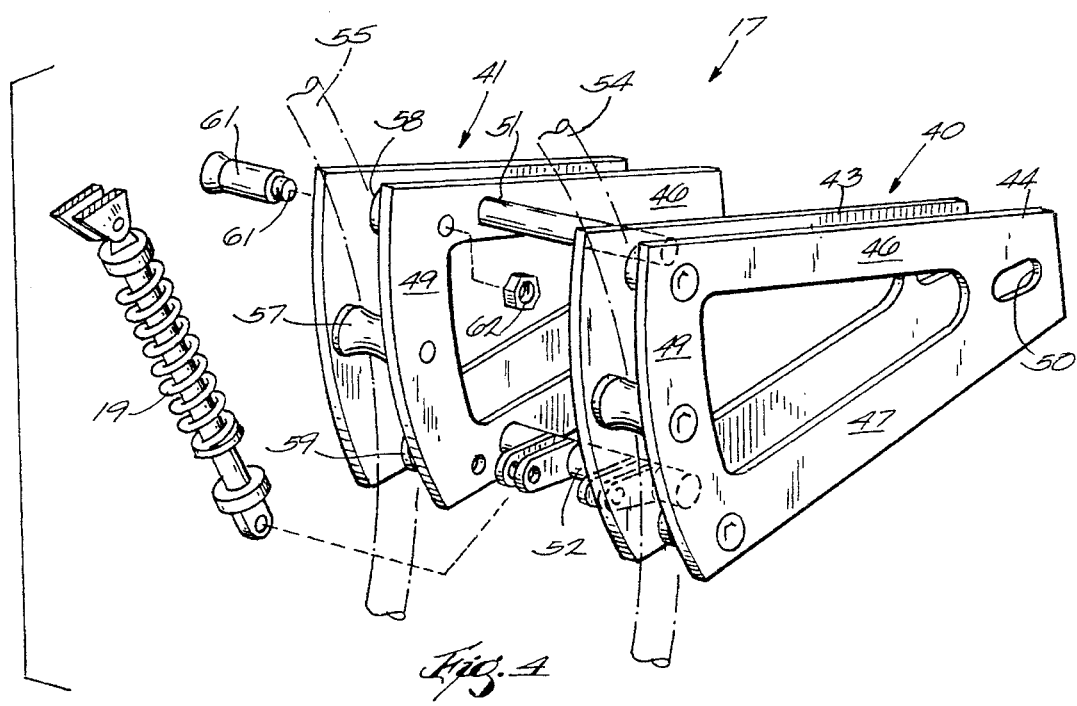
FIG. 4 is an exploded perspective view of a portion of the rear wheel suspension assembly shown in FIG. 1.
Figure 3:
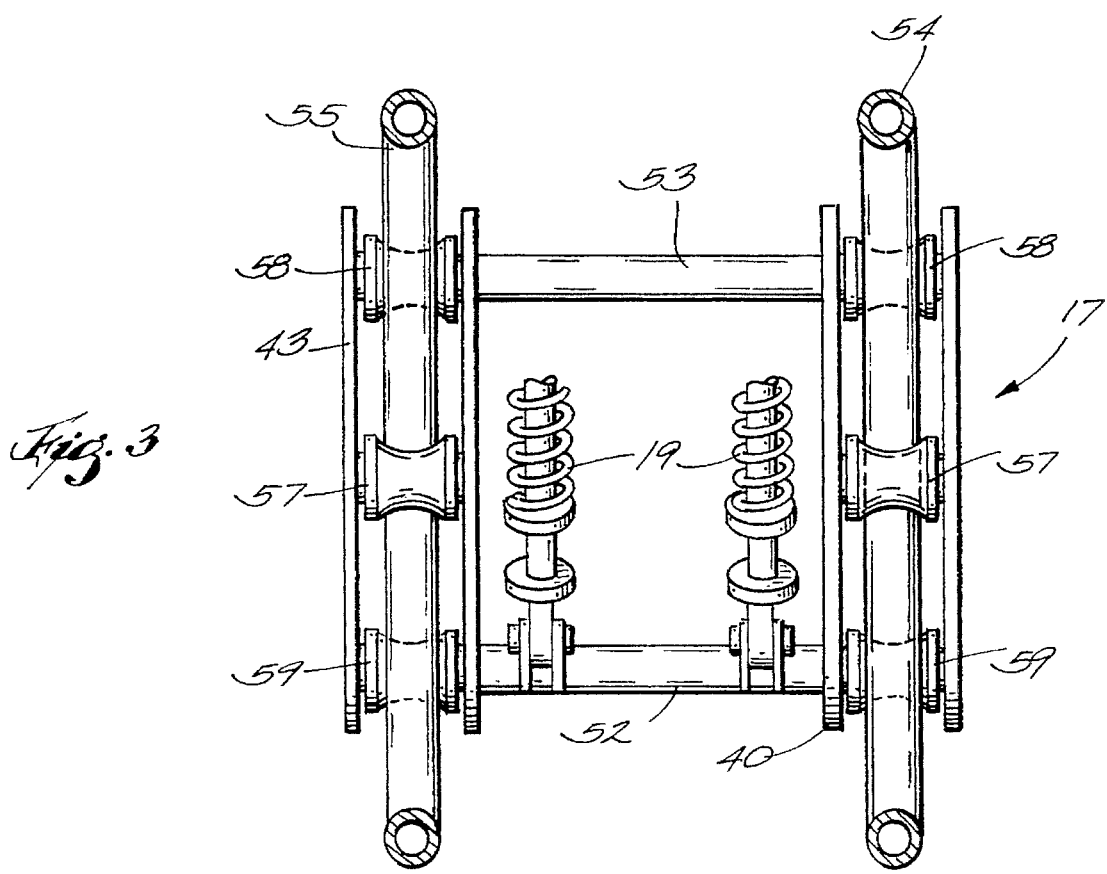
FIG. 3 is a view taken along lines 3—3 of FIG. 1.

With reference to FIGS. 2–4, the roller arm 17 comprises a pair of identical assemblies 40 and 41. Each of the assemblies 40 and 41 includes a pair of parallel, spaced apart members 43 and 44, each of which consists of a pair of diverging legs 46 and 47 and an arcuate end 49. At the intersection of the legs 46 and 47, there is an elongate slot 50 for receiving the axle 29 of the wheel 18. The assemblies 40 and 41 are retained in a parallel spaced apart relation by cross members 52 and 53.

At the rear of the frame 10 and attached to the tubes 36 are a pair of tubular rails 54 and 55 disposed in a parallel spaced apart relation. The rails 54 and 55 each define an arc and are positioned such that their centers of curvature are located at the axis 28 of the drive sprocket 22.

Between the arcuate ends 49 of the members 43 and 44 of each assembly 40 and 41 there are three rollers 57, 58 and 59, which are rotatably mounted on pins 61 extending through aligned holes in the members 43 and 44 and whose ends 61 are threaded for being secured by nuts 62. The surface of each roller is a hyperboloid and is complementary to the surfaces of the rails 54 and 55. A first roller 57 is located along the axis of each assembly 40 and 41 and the other two are adjacent to the junctions of the arcuate ends 49 and the legs 46 and 47 of the members 43 and 44. In the preferred embodiment, the rollers 57, 58 and 59 are arranged such that when the center rollers 57 engage one side of the rails 54 or 55, the outer rollers 58 and 59 are positioned on the opposite side thereof. As a result, the roller arm 39 is captured by the rails 54 and 55, but is free to move along the arcurate path which they define. This movement is dampened by the shock absorber 19 whose upper end is pivotally connected to the frame 10 and whose lower end is pivotally connected to the cross brace 52. While three rollers are shown, it will be appreciated that additional rollers may also be provided.

As the motorcycle is driven, road shocks move the roller arm 17 along the rails 54 and 55 and against the action of the shock absorbers 19. As the roller arm 17 moves, all points, including the axis 29 of the sprocket 26, move in an arc whose center of curvature is the axis 28 of the drive sprocket 22. Accordingly, regardless of the movement of the roller arm 17, the distance between the axis 28 of the drive sprocket 22 and the axis 29 of the driven sprocket 26 remains unchanged so that the belt 20 meshes with drive sprocket 22 and driven sprocket 26 in a uniform and consistent manner. As a result, undue wear on the drive belt 20 caused by constant changes in tooth to sprocket teeth alignment is eliminated. Moreover, since there is a reduction in the change of degree of anti-squat, a more uniform feel and better handling is achieved.

While only single embodiment of the invention has been illustrated and described, it is not intended to be limited thereby but only by the scope of the appended claims.

I claim:

1. The combination of, a motorcycle frame, an engine and a transmission mounted on the frame, a rear wheel suspension mounted on the frame and including rear wheel support means for rotatably supporting a rear wheel, a rear wheel mounted on said rear wheel support means for rotation about a first rotation axis, first sprocket means mounted on the wheel for rotation about the first rotation axis, second sprocket means coupled to said transmission for rotation about a second rotation axis, belt means coupling said first and second sprocket means, mounting means mounted on said frame for supporting said rear wheel support means for movement in an arcuate path displaced from said second rotation axis and having a center of curvature coincident with said second rotation axis so that the distance between said first and second rotation axes remains substantially constant as said mounting means moves in said arcuate path during operation of said motorcycle, said rear wheel support means being wholly positioned on said mounting means in a spaced. apart relation from said first rotation axis.

2. The combination set forth in claim 1 wherein said means for supporting said rear wheel support means includes means defining an arcuate path displaced from said second sprocket means.

3. The combination of a motorcycle frame, an engine and a transmission mounted on the frame, a rear wheel suspension mounted on the frame and including a rear wheel support means, a rear wheel mounted on said rear wheel support means for rotation about a first rotation axis, first drive means mounted on the rear wheel for rotation about the first rotation axis, second drive means coupled to said transmission for rotation about a second rotation axis, belt means coupling said first and second drive means, said rear wheel support means being wholly displaced from said first rotation axis, mounting means mounted on said frame between said first and second drive means for supporting said rear wheel support means for movement in an arcuate path having a center of curvature coincident with said second rotation axis so that the distance between said first and second rotation axes remains substantially constant as said motorcycle is operated.

4. The combination of, a motorcycle frame, an engine and a transmission mounted on the frame, a rear wheel suspension mounted on the frame and including a wheel support means, a rear wheel mounted on said wheel support means for rotation about a first rotation axis, first sprocket means mounted on the rear wheel for rotation about the first rotation axis, second sprocket means coupled to said transmission for rotation about a second rotation axis, belt means coupling said first and second sprocket means, mounting means mounted on said frame and displaced from said second sprocket means for supporting said wheel support means for movement in an arcuate path having a center of curvature coincident with said second rotation axis so that the distance between said first and second rotation axes remains substantially constant as said motorcycle is operated, said mounting means comprising arcuate rail means for defining an arcuate path whose center of curvature is coincident with said second rotation axis, and roller means mounted on said wheel support means for engaging said rail means whereby said wheel support means is movable in the arcuate path defined by said rail means.

5. The combination set forth in claim 4 wherein said wheel support means comprises a pair of spaced apart arm means, said wheel means being rotatably mounted between said arm means, said rail means comprising a pair of rails and roller means disposed on each of said arm means for engaging one of said rails.

6. The roller arm set forth in claim 5 wherein there are at least three rollers disposed on said arm means, one of said roller means being disposed between the other two, said rollers being arranged such that said one roller engages one side of the rail means and the other rollers engage the other side thereof so that the wheel support means is mounted on and movable along the arcuate path defined by the rail means.

7. The combination set forth in claim 5 wherein there are at least three rollers on each arm means, one of said rollers on each arm means being disposed between the other two, each said one roller being disposed on one side of one of said rails and the other two rollers being disposed on the other side thereof, whereby said wheel support means is movable in the arcuate path defined by said rails.

8. The combination set forth in claim 7 wherein each of said arm means includes legs which diverge from one end and an arcuate side at the other end for supporting said roller means, said wheel means being rotatably mounted between the one ends of said arm means.

9. The combination set forth in claim 8 and including shock absorbing means coupled to the frame and to the wheel support means.

10. The combination of a motorcycle frame, an engine and a transmission mounted on the frame, a rear wheel suspension mounted on the frame and including wheel support means, a wheel mounted on said wheel support means for rotation about a first rotation axis, first drive means mounted on the wheel for rotation about the first rotation axis, second drive means coupled to said transmission for rotation about a second rotation axis, belt means coupling said first and second drive means, mounting means mounted on said frame between said first and second drive means for supporting said wheel support means for movement in an arcuate path having a center of curvature lying on the side of said path opposite said first rotation axis and coincident with said second rotation axis so that the distance between said first and second rotation axes remains substantially constant as said motorcycle is operated, said mounting means comprising arcuate rail means for defining an arcuate path whose center of curvature is coincident with said second rotation axis, and roller means mounted on said wheel support means for engaging said rail means whereby said wheel support means is movable in the arcuate path defined by said rail means.

11. The roller arm set forth in claim 10 wherein there are at least three rollers disposed on said wheel support means, one of said roller means being disposed between the other two, said rollers being arranged such that said one roller engages one side of the rail means and the other rollers engage the other side thereof so that the wheel support means is mounted on and movable along the arcuate path defined by the rail means.

12. The combination set forth in claim 10 wherein said wheel support means comprises a pair of spaced apart arm means, said wheel means being rotatably mounted between said arm means, a pair of rail means spaced apart the same distance as said arm means, and roller means disposed on each of said arm means for engaging one of said rail means.

13. The combination set forth in claim 12 wherein there are at least three rollers on each arm means, one of said rollers on each arm means being disposed between the other two, each said one roller being disposed on one side of said rail means and the other rollers being disposed on the other side thereof, whereby said wheel support means is movable in the arcuate path defined by said rail means.

14. The combination set forth in claim 13 wherein each of said arm means includes legs which diverge from one end and an arcuate side at the other for supporting said roller means, said wheel means being rotatably mounted between the one ends of said arm means.

15. A roller arm for supporting the rear wheel of a motorcycle having a frame, said roller arm comprising arm means, said rear wheel being rotatably mounted on said arm means, a plurality of rollers disposed on said arm means for engaging an arcuate rail mounted on the motorcycle frame, said rollers being constructed and arranged to engage and be mounted on the roller means, whereby said wheel support means is movable in the arcuate path defined by the rail means.

16. The roller arm set forth in claim 15 wherein there are at least three rollers disposed on said arm means, one of said roller means being disposed between the other two, said rollers being arranged such that said roller engages one side of the rail means and the other rollers engage the other side thereof so that the wheel support means is mounted on and movable along the arcuate path defined by the rail means.

17. The roller arm set forth in claim 16 wherein the arm means comprises a pair of spaced apart arm members, the rear wheel being rotatably mounted between the arm members.

* * * * *